May 21, 1963 S. FAWCETT 3,090,742
TEMPERATURE CONTROL MEANS FOR NUCLEAR REACTORS
Filed June 19, 1959

INVENTOR
SYDNEY FAWCETT

United States Patent Office 3,090,742
Patented May 21, 1963

3,090,742
TEMPERATURE CONTROL MEANS FOR NUCLEAR REACTORS
Sydney Fawcett, Hale Barnes, England, assignor to United Kingdom Atomic Energy Authority, London, England
Filed June 19, 1959, Ser. No. 821,493
Claims priority, application Great Britain June 27, 1958
5 Claims. (Cl. 204—193.2)

This invention relates to nuclear reactors and it is concerned with temperature control of graphite moderated nuclear reactors.

A gas-cooled, natural or only slightly enriched uranium fueled graphite moderated reactor has a reactivity dependent upon the temperature of components in the reactor. Where reactivity increases with temperature the reactor is said to have a positive reactivity coefficient (expressed in units of reactivity change per ° C. temperature change) and where it decreases with temperature, a negative reactivity coefficient. The positive coefficient represents a tendency to instability which is not necessarily serious in itself as it may be controlled or, in the last event, it may be overcome by shutting down the reactor.

The fuel in the reactor has, considered on its own, a negative reactivity coefficient. When considered in combination with graphite, however, conditions can occur that give rise to a positive coefficient. These conditions arise as the plutonium content of the fuel increases, plutonium having the property (in the temperature ranges being considered) of an increasing fission cross-section as neutron energies increase (i.e. as moderator temperatures increase). If the increased fission rate is left uncontrolled a further temperature increase (after a short thermal time lag) in the graphite takes place and the fission rate is increased further. This temperature sensitive growth of fission rate can, of course, be arrested by a control operator but it may be considered inadvisable, or even impractical, to burden a control operator with the control of continuously meandering factors of which that referred to above is only one.

It is therefore an object of the present invention to provide arrangements in a graphite moderated nuclear reactor removing or mitigating a positive reactivity coefficient.

According to the present invention a graphite moderated nuclear reactor has means for dividing the coolant passing through the reactor into a fuel element coolant fraction and a moderator coolant fraction, and adjustable means for altering the relative sizes of said fractions.

In one form of the invention the adjustable means is operated in a manner to increase the moderator fraction as the fuel element fraction increases in temperature.

The moderator coolant fraction may flow through the whole of the graphite moderator or only a part of it. For example, where it is required to avoid or reduce the storage of Wigner energy in the graphite in the regions of the cool inlet gas the moderator coolant can be arranged to commence part way through the graphite structure, so that the graphite in the cool regions is not sub-cooled.

It may also be arranged that the moderator coolant fraction increases with falling pressure drop through the reactor such as would occur in the event of reduction in the coolant flow due to failure of a coolant circulating pump, the increasing fraction modifying the transient subsequent to such an event.

Alteration of the relative size of the fractions may be arranged to occur as a part of a normal operating characteristic or to enhance safety under accident conditions. Alterations of the fractions could affect starting characteristics by permitting the full moderator temperature to be attained at low powers.

Where the reactor is supplying heat to a boiler for the generation of a working medium to drive a turbine it is undesirable, purely from thermodynamic considerations, to allow the moderator coolant fraction to be of such a size that it degrades the outlet temperature of the fuel element coolant fraction. For a typical case, 6% moderator coolant and 94% fuel element coolant gives no temperature degradation, an outlet temperature from the reactor of 500° C. being practicable. In this case the moderator in the outlet region would also be slightly above 500° C. If, in the same case, the moderator were limited to a maximum of 375° C. by a 12% moderator coolant flow the outlet temperature from the reactor would be degraded to 485° C.

A constructional example embodying the invention will now be particularly described with reference to the accompanying drawings, wherein—

Figure 1:
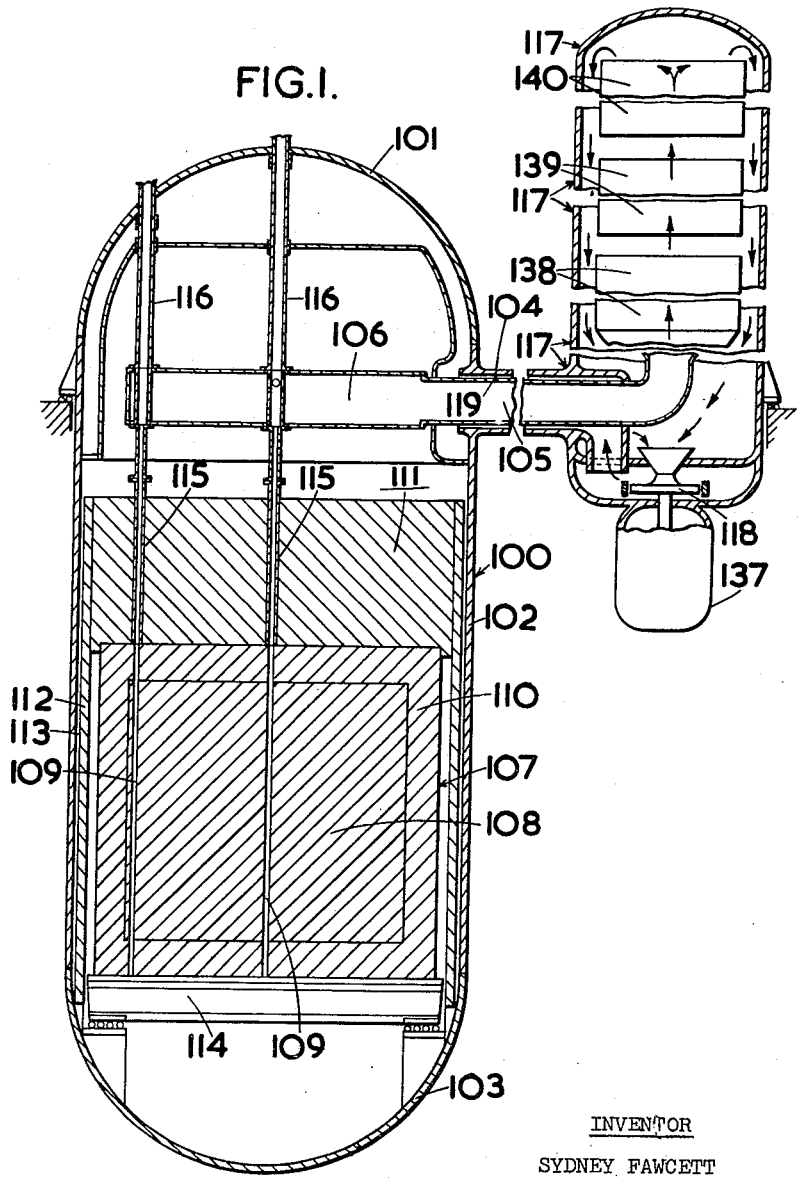
FIGURE 1 is a diagrammatic side view in medial section.

Referring to FIGURE 1 of the drawings, there is illustrated diagrammatically a nuclear reactor having a pressure vessel 100 consisting of a top dome 101, a generally cylindrical portion 102 and a bottom dome 103 and containing a core consisting of a graphite moderator 108 and graphite reflector 110 pierced by vertical channels 109 (two only of which are shown for the sake of clarity) the majority intended for fuel elements and the remainder for control rods, shut-off devices, flux scanning gear, graphite sampling equipment, etc. Above the core is disposed a neutron shield 111 pierced by tubes 115 aligned and communicating with the channels 109, the tubes 115 communicating at their upper ends with a hot box 106 and with standpipes 116 which pierce the upper dome and serve for access to the channels 109 for refuelling and other purposes. The core 109, 110 and neutron shield 111, are surrounded by a thermal shield 112 spaced from the cylindrical wall of the portion 102 of the pressure vessel to provide a passage 113 therebetween. The core 108, 110 and neutron shield 111 are supported by a diagrid 114 itself supported by brackets on the interior of the dome 103 of the pressure vessel, the load on the brackets being transferred through the shell of the pressure vessel to foundations.

The hot box 106 communicates via ducting 105 with one or more heat exchanges, one only being shown in FIGURE 1 for the sake of clarity and designated 117. A circulator 118 whose drive is contained in a housing 137 is disposed within the shell of the heat exchanger 117 at the bottom thereof and return ducting 104 coaxial with the ducting 105 and providing an annular passage 119 between the ducting 104, 105 communicates with the interior of the pressure vessel. Coolant (for example carbon dioxide) under pressure is circulated by the circulator 118 and flow takes place along the annular passage 119 between ducting 104 and 105, into the pressure vessel to cool the dome 101, downwardly through the passage 113 to cool the thermal shield and the wall of the pressure vessel portion 102, then upwardly through those of the channels 109 containing fuel elements which transfer nuclear heat to the coolant, upwardly through the tubes 115 into the hot box 106, along the ducting 105 to the heat exchanger 117 wherein it flows upwardly successively through a superheater 138, an evaporator bank 139 and an economiser bank 140 whereby the heat in the coolant is exchanged to raise and superheat steam which can be employed in well-known manner to drive a turbo-generator (not shown) for producing electric power. The coolant after giving up its heat then flows downwardly in contact with the wall of the heat exchanger 117 to cool it, and thence to the circulator 118 for return to the reactor pressure vessel. It will be appreciated that the coolant flow takes place in a closed system as described.

Figure 2:
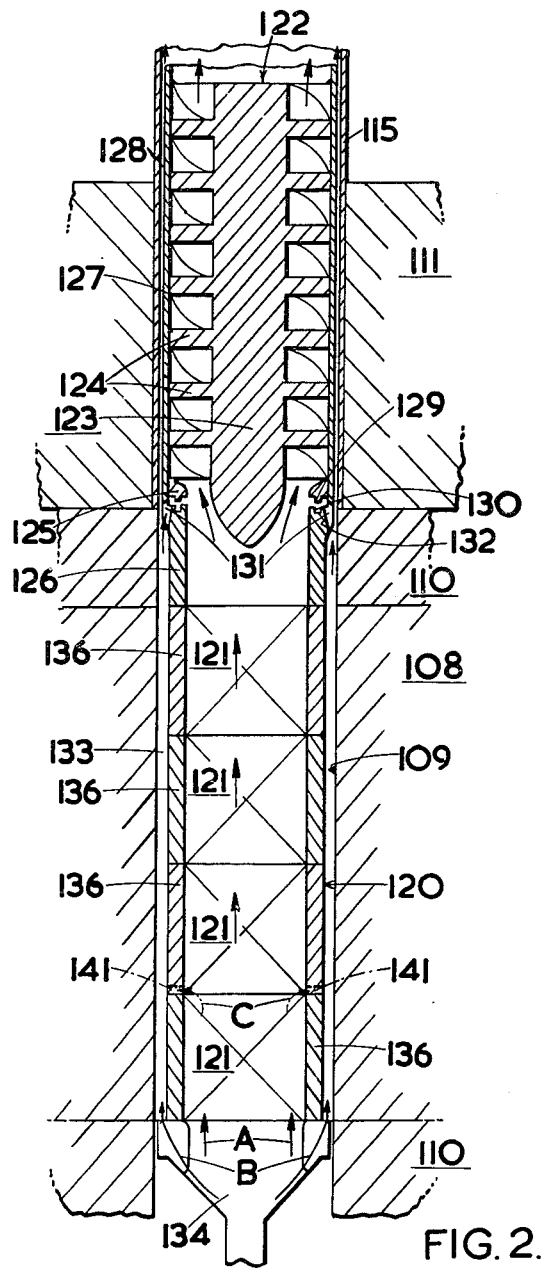
FIGURE 2 is an enlarged side view in medial section and illustrates a detail.

Referring now to FIGURE 2, which shows a channel 109 containing a fuel element assembly 120 shown diagrammatically and consisting of four fuel elements 121, which may be interconnected, and a neutron shield plug 122 connected to the uppermost fuel element via a distance piece 126 and consisting of a central axial part 123 provided with helical ribs 124 whose outer edges contact a sleeve 127 and which obstruct a direct escape path for neutrons streaming from the core so that the neutrons become scattered and absorbed in the neutron shield 111. The ribs 124 are joined, as by welding, at their upper end to the sleeve 127 which is integral with the distance piece 126. The sleeve 127 is spaced from the tube 115 perforating the neutron shield 111 to provide a restricted annular passage 128 therebetween. The lower end of the ribs 124 is provided with a projection 125 having an annular rib 129 which can engage with a corresponding annular recess 130 in the upper end of the distance piece 126 and a plurality of apertures 131 are provided adjacent the rib 129 and recess 130 in a neck 132 which joins the sleeve 127 to the distance piece 126. The neck 132 provides a step which prevents neutrons from the core from streaming up the passage 128. The sleeve 127, distance piece 126 and neck 132 are made from a material which is different from that of the ribs 124 such that differential expansion takes place on heating with the result that the restriction to coolant flow through the apertures 131 effected by the rib 129 co-operating with the recess 130 becomes less on increase of temperature and increases on decrease of temperature. Suitable materials are a ferritic steel, such as a rust resisting alloy steel containing 12–14% Cr and 1% Ni, for the ribs 124 and an austenitic steel, such as a stabilised stainless alloy steel containing 18% Cr and 8% Ni, for the sleeve 127, distance piece 126 and neck 132.

The fuel elements 121 which are described more fully in our copending application Serial No. 787,430 have sleeves 136 (conveniently of graphite) which are spaced from the wall of the channel 109 to provide an annular passage 133 therebetween, the sleeves 136 fitting one another at their ends to prevent leakage between the passage 133 and their interior. The fuel element assembly 120 is supported on a stool 134, the stool 134 being arranged so that coolant flow can pass upwardly through the fuel elements 121 (as indicated by the arrows A), and also upwardly through the annular passage 133 (as indicated by the arrows B), and up the passage 128 to join the fuel element coolant fraction at the top of the assembly 120. Since the flow in passage 128 is largely restricted, the flow in pasage 133 is governed by the amount of coolant allowed to rejoin the fuel element coolant fraction via the apertures 131 and this is governed by the amount of restriction applied by the rib 129 and recess 130, which itself is governed by the temperature of the coolant which has passed through the fuel elements 121. It will be appreciated that the flow of coolant through the annular passage 133, being somewhat thermally insulated from the fuel elements 121 by the sleeves 136 in which they are contained, serves to cool the moderator 108, the amount of moderator cooling being governed by the flow in the passage 133, and further that alteration of moderator cooling, with its attendant effect on reactivity, is effected by alteration in outlet temperature of the coolant, provided that heat degradation by the moderator coolant fraction is not substantial.

The effect of such an alteration of moderator coolant flow on reactivity would depend upon a number of factors such as thermal time constants of the system, the nature of the coolant, the nature of heat exchange surfaces and the plutonium concentration in the fuel. By suitable selection of restriction characteristic (e.g. regulation effected by a specified temperature change, determined by the amount of differential expansion) the reactor can be given the effect of a negative reactivity coefficient, an approximately uniform coefficient or a reduced positive coefficient. A large negative coefficient may be undesirable as it can also cause instability.

Reduction of the restriction provided by the rib 129 and recess 130 on increase of the temperature of the coolant outflowing from the fuel elements 121 also slightly increases the total amount of coolant flowing up the channel 109 due to slight reduction in the pressure drop between the ends of the assembly on decrease of the restriction. This compensates for reduction in the amount of fuel element coolant fraction on increase of the moderator coolant fraction which could otherwise lead to a further increase in the temperature of the fuel element coolant fraction.

If problems of Wigner energy storage dictate that cooling of the lower regions of the moderator is not desirable, it can be arranged that the support stool 134 only allows coolant flow to take place through the open end of the lowermost sleeve 136 and prevents coolant flow into the annular passage 133, and that a gap 141 provided between the ends of adjacent sleeves 136 (for example as indicated in dot-and-dash lines in FIGURE 2) allows leakage of coolant (indicated by dot-and-dash arrows C) into that part of the passage 133 where cooling of the moderator is desired.

An alternative way of carrying the invention into effect, not shown, is by a valve controlling moderator coolant flow and located in the coolant outlet regions of each channel so as to be sensitive to the outlet temperature of the fuel element fraction. The valve could be operated by thermal expansion of the valve stem, of example, a valve stem of 100 inches operating a valve having a normal opening of 0.2 inch could be made to alter the moderator coolant flow by 1% for a temperature change of 0.1% (0.25° C.) in the fuel element coolant temperature.

In another alternative way of carrying the invention into effect, the fuel elements are supported in graphite tubes which are themselves contained in a cage of material having a larger coefficient of expansion than the graphite, the cage being loosely keyed into the graphite tubes. It can then be arranged that over a specified range of temperature the tubes are in end contact with one another to form a continuous channel. When temperatures reach the upper limit of the range the slack in the keys is taken up and thereafter the cage, growing faster than the graphite tubes, lifts the tubes apart from one another so that coolant leaks out from the tubes to pass into the graphite. Such a device may be arranged to operate on the tubes to achieve varying amounts of movement between the tubes according to the distance apart of the keys and the slacks in the keyways. There would also be the added effect of spacing the fuel further apart as the sleeves moved, thereby reducing the reactivity further to enhance stability.

I claim:

1. A nuclear reactor comprising a graphite moderator at least one channel extending through said moderator, at least one nuclear fuel element disposed within said channel, coolant for said moderator and fuel element, means defining two separate coolant passages within said channel, means for effecting coolant flow through said two coolant passages, one of said coolant passages comprising a fuel element coolant passage having a means for heat exchange between said fuel element and the coolant in said one coolant passage, the other of said coolant passages comprising a moderator coolant passage having means for heat exchange between said moderator and the coolant in the other of said coolant passages, and temperature sensitive control means controlled by the temperature of the coolant in one of said two coolant passages for adjusting the relative rates of flow of coolant in the two passages.

2. A nuclear reactor as described in claim 1 wherein said temperature sensitive control means further comprises at least one adjustable restrictor valve in at least one of said coolant passages actuated by valve operating means controlled by the temperature of the coolant in at least one of said coolant passages.

3. A nuclear reactor described in claim 2 wherein said valve operating means comprises a valve operating member contacting the coolant in the fuel element cooling passage and operatively connected with said valve to actuate said valve by thermal expansion and contraction of said member.

4. A nuclear reactor as described in claim 2 wherein said adjustable restrictor valve comprises a valve seat and a valve head cooperatively disposed in the fuel element coolant passage for adjustably restricting flow of coolant in said coolant passages, and said valve actuating means comprises two actuating members both being in contact with the coolant in said fuel element coolant passage and each having a different coefficient of thermal expansion and both connected at one end of each to one end of the other and connected each at its other end respectively one to the valve seat and one to the valve head for operation of said valve upon change in the temperature of coolant in said passage.

5. A nuclear reactor as described in claim 4 wherein said fuel element cooling passage includes a coolant outlet and the valve head and seat are positioned at the coolant outlet of said fuel element coolant passage and said valve actuating members comprise at least a portion of the fuel element in said passage and at least a portion of the outer walls of said passage.

References Cited in the file of this patent

UNITED STATES PATENTS

| 1,612,854 | Broido | Jan. 4, 1927 |
| 1,980,624 | Kenny | Nov. 13, 1934 |
| 2,771,248 | Ehlke | Nov. 20, 1956 |
| 2,782,158 | Wheeler | Feb. 19, 1957 |

FOREIGN PATENTS

| 792,171 | Great Britain | Mar. 19, 1958 |
| 1,190,253 | France | Mar. 31, 1959 |

OTHER REFERENCES

TID–7529 (Pt. 1), Book 1, Reactor Heat Transfer Conference of 1956, USAEC report dated November 1957, pages 248–250, 254.